US010837557B2

(12) United States Patent
Wagoner et al.

(10) Patent No.: US 10,837,557 B2
(45) Date of Patent: Nov. 17, 2020

(54) AXIALLY SLIDING SEAL

(71) Applicant: Trelleborg Sealing Solutions US, Inc., Fort Wayne, IN (US)

(72) Inventors: Samuel D. Wagoner, Woodburn, IN (US); Jeff A. Baehl, Fort Wayne, IN (US); Larry J. Castleman, Monroeville, IN (US)

(73) Assignee: Trelleborg Sealing Solutions US, Inc., Fort Wayne, IN (US)

( * ) Notice: Subject to any disclaimer, the term of this patent is extended or adjusted under 35 U.S.C. 154(b) by 403 days.

(21) Appl. No.: 15/234,598

(22) Filed: Aug. 11, 2016

(65) Prior Publication Data

US 2016/0348791 A1 Dec. 1, 2016

Related U.S. Application Data

(63) Continuation of application No. PCT/US2015/015144, filed on Feb. 10, 2015.

(60) Provisional application No. 61/938,874, filed on Feb. 12, 2014.

(51) Int. Cl.
*F16J 15/32* (2016.01)
*F16J 15/3232* (2016.01)
*F16J 15/3256* (2016.01)

(52) U.S. Cl.
CPC ....... *F16J 15/3232* (2013.01); *F16J 15/3256* (2013.01)

(58) Field of Classification Search
CPC .............. F16J 15/32; F16J 15/34; F16J 15/16
See application file for complete search history.

(56) References Cited

U.S. PATENT DOCUMENTS

| 2,185,790 | A |   | 1/1940 | Kosatka et al. |   |
|---|---|---|---|---|---|
| 2,561,694 | A | * | 7/1951 | Gilbert, Sr. | F16J 15/3456 277/366 |
| 2,831,713 | A |   | 4/1958 | Smith |   |
| 2,950,932 | A | * | 8/1960 | Gilbert | B63H 23/36 277/365 |
| 3,090,629 | A | * | 5/1963 | Lee | F16J 15/3484 277/367 |
| 3,442,516 | A | * | 5/1969 | Voitik | F16J 15/3456 277/365 |
| 4,022,480 | A | * | 5/1977 | Salter, Jr. | B21B 31/078 277/367 |
| 4,099,731 | A | * | 7/1978 | Salter, Jr. | B21B 31/078 277/347 |

(Continued)

FOREIGN PATENT DOCUMENTS

DE 41 18 382 A1 12/1992
DE 198 39 485 A1 3/2000

OTHER PUBLICATIONS

Extended European Search Report dated Jan. 4, 2018 for European Patent Application No. 15 74 9422 (8 pages).

(Continued)

*Primary Examiner* — Vishal A Patel
(74) *Attorney, Agent, or Firm* — Taylor IP, P.C.

(57) ABSTRACT

A seal assembly includes a pair of opposing seal lips, a bearing contacting both seal lips, a wall structure placed between and in contact with both seal lips, and a housing enclosing the pair of seal lips and the bearing that is configured to axially slide the seal lips, wall structure and bearing as the housing axially slides.

8 Claims, 5 Drawing Sheets

(56) References Cited

U.S. PATENT DOCUMENTS

| | | | |
|---|---|---|---|
| 4,553,762 | A | 11/1985 | Hoelzer |
| 4,709,930 | A | 12/1987 | Forch |
| 4,848,776 | A | 7/1989 | Winckler |
| 5,009,435 | A | 4/1991 | Villanyi et al. |
| 5,209,502 | A | 5/1993 | Savoia |
| 6,257,587 | B1 | 7/2001 | Toth et al. |
| 6,945,536 | B2 | 9/2005 | Iwakata et al. |
| 8,387,990 | B2 | 3/2013 | Castleman et al. |
| 2002/0113374 | A1 | 8/2002 | Schmitt |
| 2012/0068419 | A1 | 3/2012 | Berdichevsky et al. |
| 2013/0015624 | A1 | 1/2013 | Fuji et al. |

OTHER PUBLICATIONS

Korean Written Opinion, dated May 19, 2015, 4 pages.
International Search Report, dated May 19, 2015, 3 pages.

* cited by examiner

AXIALLY SLIDING SEAL

CROSS REFERENCE TO RELATED APPLICATIONS

This is a continuation of PCT application No. PCT/US2015/015144, entitled "AXIALLY SLIDING SEAL", filed Feb. 10, 2015, which is incorporated herein by reference. PCT application No. PCT/US2015/015144 is based upon U.S. provisional patent application Ser. No. 61/938,874, entitled "AXIALLY SLIDING RADIAL SEAL", filed Feb. 12, 2014, which is incorporated herein by reference.

BACKGROUND OF THE INVENTION

1. Field of the Invention

The present invention relates to sealing assemblies.

2. Description of the Related Art

A seal is a structure included in devices to prevent media from flowing past the seal into other areas of the device. Seals come in a great variety of shapes and sizes, depending on their intended application(s). One type of seal is a radial oil seal which is disposed around a rotating element, such as a shaft, and creates a seal around the rotating element in the radial direction which is perpendicular to the rotating element's axis of rotation. Another type of seal is an axial oil seal which is disposed around a rotating element and creates a seal around the rotating element in the axial direction which is along the rotating element's axis of rotation.

One problem with known radial and axial oil seals is that they are not well-suited to be used in applications where axial movement might be experienced by the seal without using large axial spaces. In such situations, components of the seal can come apart or loads on the exclusionary lips can be altered in such a way that the seal is compromised.

What is needed in the art is a seal assembly that is capable of consistent performance in applications where axial and radial movement of the seal is either likely to occur or a desirable event, while being able to fit in a small axial space.

SUMMARY OF THE INVENTION

The present invention provides a seal assembly that is capable of maintaining a seal during axial and radial movement and can be fit into a small axial space compared to known seals.

The invention in one form is directed to a seal assembly that includes a pair of opposing seal lips, a bearing contacting both seal lips, a wall structure placed between and in contact with both seal lips, and a housing enclosing the pair of seal lips and the bearing that is configured to axially slide the seal lips, wall structure and bearing as the housing axially slides.

The invention in another form is directed to a seal assembly including a seal lip with a bearing portion defining a first end and a second end, a first exclusion lip being connected to the first end and a second exclusion lip being connected to the second end; a bearing in contact with the bearing portion; and a housing enclosing the seal lip and the bearing that is configured to axially slide the seal lip and the bearing as the housing axially slides.

An advantage of the present invention is that it can be used in applications where axial and radial movement of the seal is likely to occur or desirable, and in applications where axial space is limited.

Another advantage of the present invention is that the seal can be adapted to seal in axial and radial directions of a sealing space.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
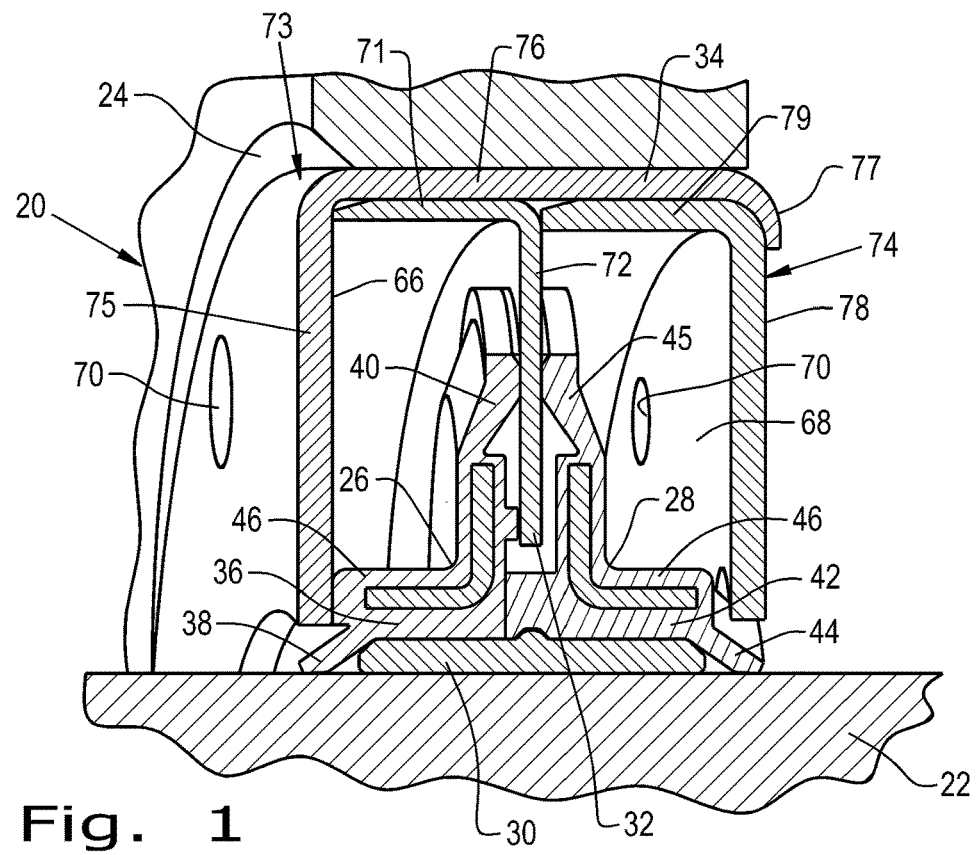
FIG. 1 is a cross-sectional view of an embodiment of a seal assembly according to the present invention.
Figure 2:
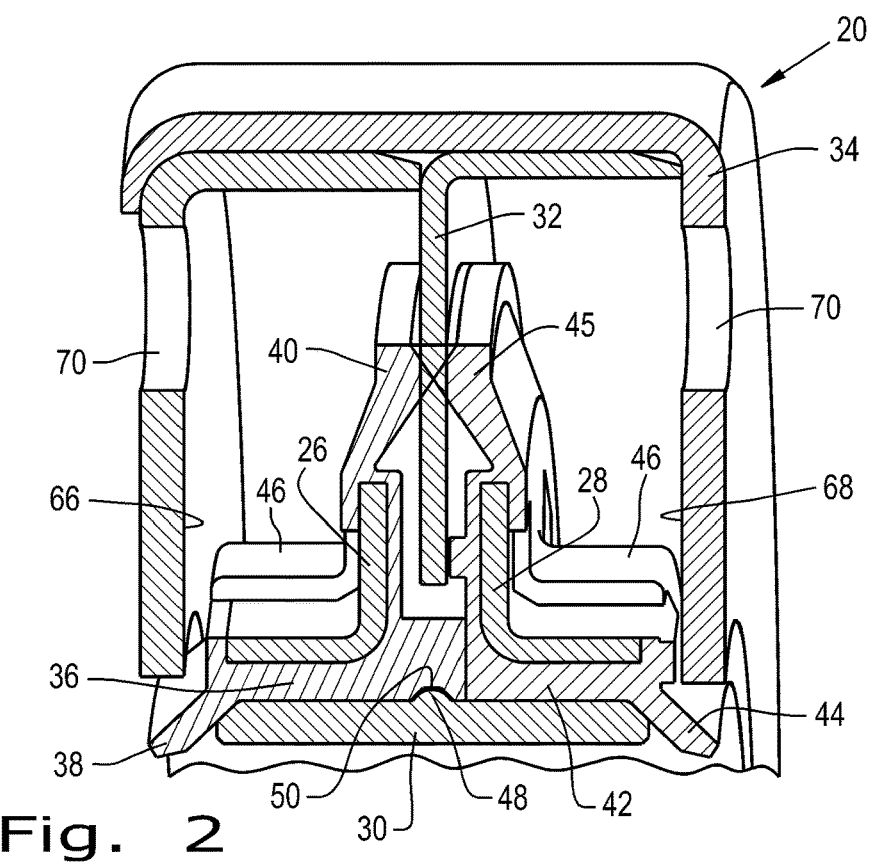
FIG. 2 is another cross-sectional view of the seal assembly shown in FIG. 1.

Referring now to the drawings, and more particularly to FIGS. 1 and 2, there is shown a seal assembly 20 disposed around a shaft 22 and held within, for example, a bore 24 of a working machine which generally includes a pair of opposing seal lips 26, 28, a bearing 30 contacting both seal lips 26, 28 and the shaft 22, a wall structure 32 contacting both seal lips 26, 28 and partly separating the seal lips 26, 28, and a housing 34 enclosing the seal lips 26, 28 and bearing 30. Unless otherwise stated, all components mentioned are connected to one another by pressure created in the sealing environment, by constraining them in a housing with correct axial and radial spacing, and/or frictional forces between the components.

A first seal lip 26 has a bearing portion 36 with a bearing surface that is in contact with the bearing 30. An exclusion lip 38 can be connected to the bearing portion 36, and an engagement portion 40 that presses against the wall structure 32 can be formed substantially perpendicular to the bearing portion 36. The bearing portion 36 has a complementary shape to the bearing 30, so that the bearing surface of the bearing portion 36 is in constant contact with the bearing 30. The exclusion lip 38 of the first seal lip 26 is shaped to keep contaminants out of the bearing 30 and keep media to be sealed in, which can help with keeping consistently lowered friction between the bearing 30 and the shaft 22 and to minimize damage to the shaft counterface. The engagement portion 40 and bearing portion 36 can form a generally L-shaped cross-section, with the exclusion lip 38 formed at an angle relative to the bearing portion 36. A second seal lip 28 can be configured similarly to the first seal lip 26 and is arranged so that the second seal lip 28 is opposed to the first seal lip 26. The second seal lip 28 also includes a bearing portion 42 with a bearing surface that is in contact with the bearing 30. The second seal lip 28 can include an exclusion lip 44 connected to the bearing portion 42, and an engagement portion 45 that presses against the wall structure 32 can be formed substantially perpendicular to the bearing portion 44. The first seal lip 26 and second seal lip 28 are shown as having contacting bearing portions 36 and 42 in FIG. 1, but such contact is not necessary. FIG. 2 shows a close-up view of a cross-section of the seal assembly 20. As can be seen, a lug 46 can be provided on the exclusion lips 38, 44 that allows for easy positioning of the seal lips 26, 28 during installation. The lugs 46 can also be provided on the seal lips 26, 28, if desired. The first seal lip 26 and second seal lip 28 can be constructed from suitable polymers by known techniques such as molding, casting, machining, extrusion, additive manufacturing, etc. The first seal lip 26 and second seal lip 28 can be press fit into spaces within the housing 34 of the seal assembly 20 to ensure a tight fit and help keep the components of the seal assembly 20 together during use.

The bearing 30 contacts the bearing surfaces of both the first seal lip 26 and second seal lip 28 and a counterface of the rotating element 22, shown as a shaft. The bearing 30 can be annularly shaped and surround an entire circumference of the shaft 22 or only a part of the shaft 22. The bearing 30 tracks the housing 34 of the seal assembly 20, which allows for axial movement of the seal assembly 20 along the shaft 22 to provide a constant load on the seal lips 26, 28 and improves the seal assembly's sealing ability. Loads on the seal lips 26, 28 are balanced to minimize rotational spinning of the bearing 30 while still allowing for the bearing 30 to slide axially. The bearing 30 can include a ridge 48 formed on an outer surface of the bearing 30 that can be held within a groove 50 formed in one of the seal lips, for example first seal lip 26 as shown in FIGS. 1 and 2, so that axial movement of the bearing 30 can also cause axial movement of one or both seal lips 26 and 28. A low coefficient of friction between the bearing 30 and the shaft 22 allows for movement of the seal assembly 20 to occur with minimal effect on the seal assembly components. Additionally, a lubricant can be provided on the surface of the bearing 30 contacting the shaft 22 to further lower the coefficient of friction between the bearing 30 and the shaft 22.

Figure 3:
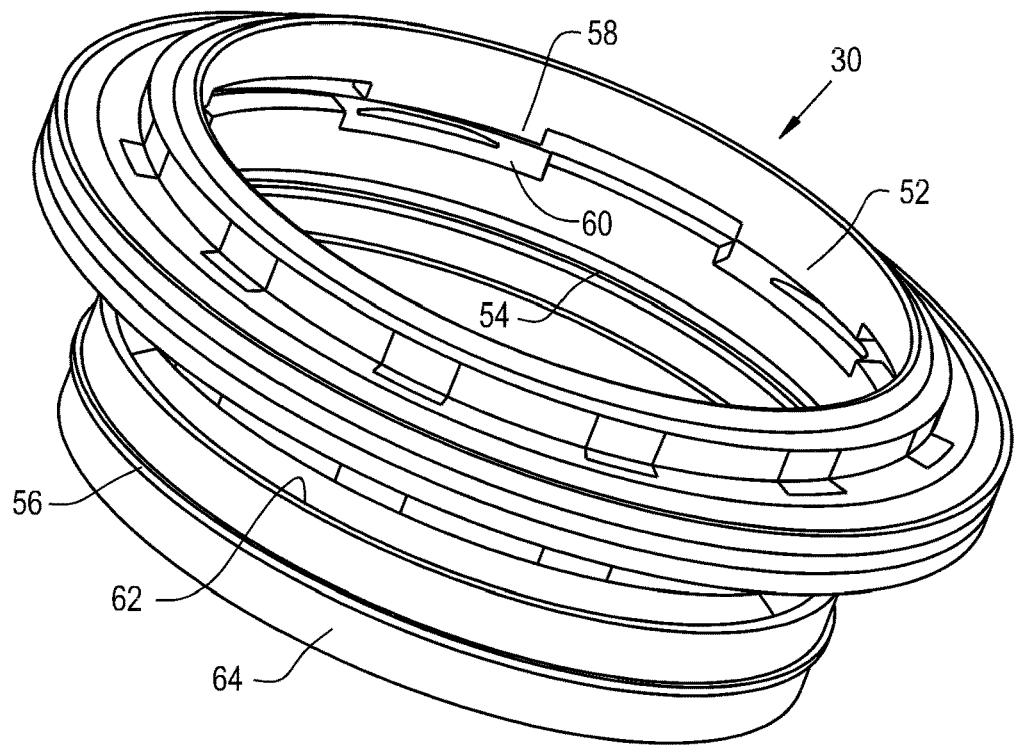
FIG. 3 is an exploded view of an embodiment of a bearing according to the present invention.
Figure 4:
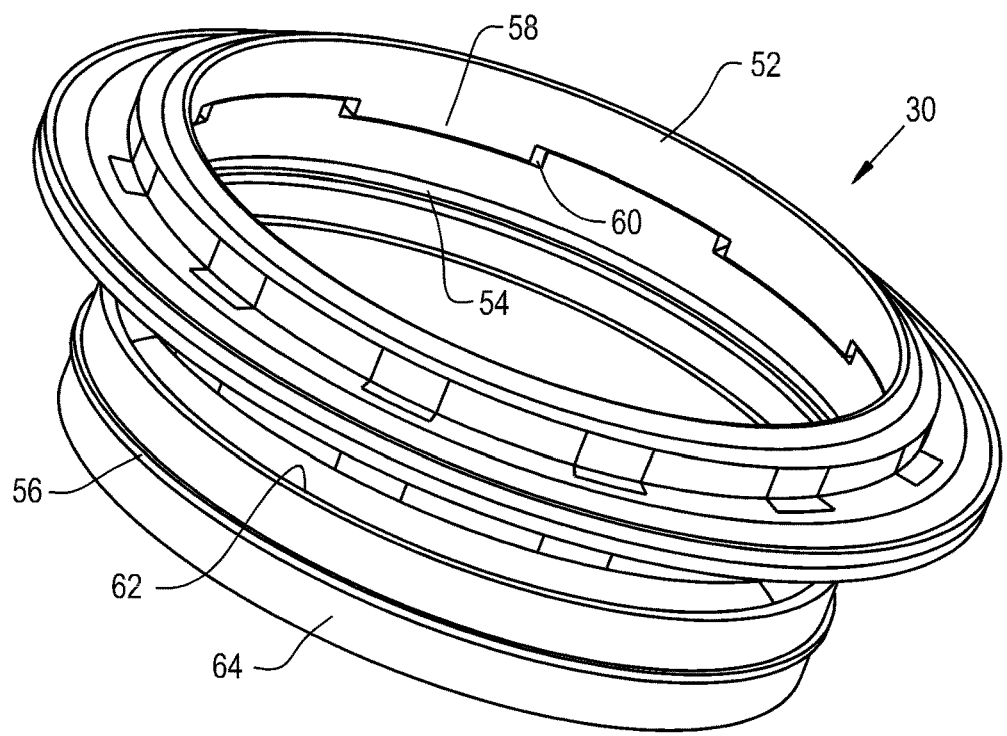
FIG. 4 is another exploded view of the bearing shown in FIG. 3.

As can be seen in FIGS. 3 and 4, the bearing 30 can be constructed as a multiple part bearing including a male bearing ring 52, a female bearing ring 54 and a shaft engaging ring 56. Protrusions 58 formed on the male bearing ring 52 interface with recesses 60 formed in the female bearing ring 54 to minimize rotation between the two bearing rings 52, 54 after assembly. The shaft engaging ring 56 has a first portion 62 with a first ring diameter and a second portion 64 with a second ring diameter that is larger than the first ring diameter. The second ring diameter can be closely matched to the diameter of the shaft 22 to form a tight fit between the bearing 30 and the shaft 22, while the first ring diameter allows the first portion 62 of the shaft engaging ring 56 to fit and be held within the female bearing ring 54 and male bearing ring 52 when they are assembled together, which can minimize the rotational spin of the bearing 30 during operation. The bearing 30 can be constructed from suitable materials including polymers and metals through known techniques such as machining, molding, casting, extrusion, additive manufacturing, etc. Further, the rings 52, 54, 56 of the bearing 30 can be formed from differing materials, which will be described in further detail herein.

The housing 34 encloses the pair of seal lips 26, 28 and bearing 30 to keep the first seal lip 26, second seal lip 28, and bearing 30 together during axial movement of the seal assembly 20 along the shaft 22. The housing 34 can contact both the first seal lip 26 and second seal lip 28 along a first tracking surface 66 and a second tracking surface 68 on the interior of the housing 34. The housing 34 can be annularly shaped and have one or more openings 70 in its walls that allow for lubrication to be introduced to the seal lips 26, 28 or for contaminants to exit out of the area enclosed by the housing 34 through the opening(s) 70. The housing 34 can be constructed from suitable polymers or metals by previously mentioned techniques. The housing 34 can be press fit into the bore 24 of the working machine such that a tight fit is created that helps keep the components of the seal assembly 20 together. The housing 34 can also be press fit on to the shaft 22, which would allow movement in the bore 24.

The wall structure 32 is placed between and in contact with the first seal lip 26 and second seal lip 28, separating the side of the housing 34 containing most of the first seal lip 26 from the side of the housing 34 containing most of the second seal lip 28. The wall structure 32 can be formed as an integral part of the housing 34 or as a separate structure. While the wall structure 32 is shown as separating the sides of the housing 34 containing the first seal lip 26 and second seal lip 28, there are situations where such separation is unnecessary or undesirable. In such cases, the positioning and shape of the wall structure 32 can be adjusted to fit the particular application.

During use, a force applied to the housing 34 or to the shaft 22 causes a net axial movement of the seal assembly 20 in a direction of the applied force. In the case where the force is applied to the housing 34, the housing 34 can transmit the pushing force to the first and second seal lips 26, 28 through the wall structure 32 as well as the first and second tracking surfaces 66, 68 of the housing 34. One of the seal lips, depending on direction of the force, can transmit force to the bearing 30 through its exclusion lip and friction along the bearing surface of the seal lips 26, 28 also helps to move the bearing 30 axially along the shaft 22. When one of the seal lips has a recess 60 defined therein that holds a protrusion 58 on the outer surface of the bearing 30, force applied to the seal lip can also be transmitted to the protrusion 58 from the respective bearing portion of the seal lip to move the bearing 30 in the direction of the applied force. All of these net axial pushing forces result in a net axial movement of the entire seal assembly 20 in a direction of the force applied to the housing 34 or shaft 22 while keeping the entire seal assembly 20 together.

Figure 5:
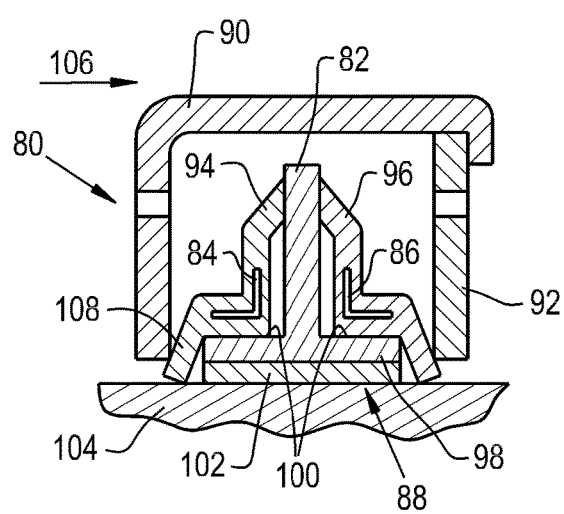
FIG. 5 is a cross-sectional view of another embodiment of a seal assembly according to the present invention.

Referring now to FIG. 5, another embodiment of a seal assembly 80 according to the present invention is shown that includes a wall structure 82 disposed between opposing first and second seal lips 84, 86 and is formed as part of a multiple part bearing 88, and a first housing portion 90 interlocked with a second housing portion 92 to form a housing that encloses the seal lips 84, 86 and bearing 88. While the housing is shown as being formed by two interlocked housing portions 90, 92, more than two portions can be interlocked or otherwise connected to form the housing if desired. In this embodiment, the first seal lip 84 and second seal lip 86 each have engagement portions 94, 96 contacting the wall structure 82. The wall structure 82 extends radially from a first bearing portion 98 with outer surfaces 100 in contact with the seal lips 84, 86 and an inner surface in contact with the outer surface of a second bearing portion 102, shown as an annular ring, which is placed over a rotating element 104, shown as a shaft. The wall structure 82 completely prevents contact between the first seal lip 84 and second seal lip 86, but does not divide the area between the first housing portion 90 and second housing portion 92 into a first side containing the first seal lip 84 and a second side containing the second seal lip 86. The entire seal assembly 80 is moved by force applied to one of the housing portions 90, 92 or shaft 104. If force is applied to, for example, first housing portion 90 in a direction of arrow 106, the first housing portion 90 pushes on first seal lip 84 in the direction of arrow 106 at a point 108 where the first seal lip 84 contacts the first housing portion 90. The first engagement portion 94 of the first seal lip 84 then pushes on the wall structure 82 to transmit the applied force to the second bearing portion 102 and the engagement portion 96 of the second seal lip 86. The applied force is therefore transmitted to all components of the seal assembly 80 to cause a net movement of the seal assembly 80 in the direction 106 of the applied force. If an applied force were applied to the second housing portion 90 in a direction opposite to direction 106, the seal assembly 80 would be moved in a similar manner, with force being initially transmitted through the second housing portion 90 to the second seal lip 86. If the applied force originated from axial movement of the shaft 104, the applied force could be initially transmitted through the wall structure 82 of the bearing 88 to the first or second engagement portion 94, 96 of the seal lips 84, 86, depending on the direction of the applied force. The seal assembly 80 would then have a net axial movement caused by the transmission of the applied force throughout the components of the seal assembly 80. The housing portions 88, 90 can include reinforcement elements to help stiffen the seal lips 84, 86, which can allow for better force transmission with less deflection. Similarly to the seal assembly 20 shown in FIGS. 1 and 2, one or both of the housing portions 88, 90 can have one or more openings formed therethrough.

As illustrated in FIG. 1, the wall structure 32 may include an axial wall section 71, which extends in an axial direction, and a radial wall section 72, which extends in a radial direction. The respective radially extending engagement portion 40, 45 of each seal lip 26, 28 may contact the radial wall section 72 of the wall structure 32. The housing 34 may include a first housing part 73 and a second housing part 74. The first housing part 73 includes a first radial housing section 75 on one axial side of the wall structure 32, a first axial housing section 76 coupled to the first radial housing section 75 and contacting the axial wall section 71 of the wall structure 32, and a retaining section 77. The second housing part 74 includes a second radial housing section 78 on an axial side of the wall structure 32 that is opposite the first radial housing section 75 and a second axial housing section 79 that is in contact with the first axial housing section 76 of the first housing part 73. The second housing part 74 and the wall structure 32 are nested between the retaining section 77 and the first radial housing section 75 of the first housing part 73 to form the housing 34.

Figure 6:
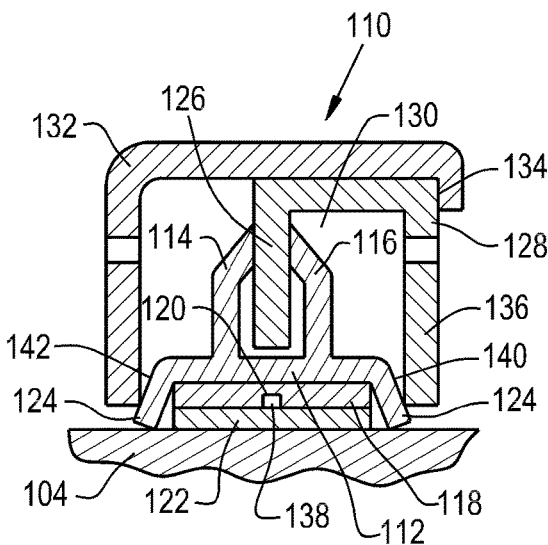
FIG. 6 is a cross-sectional view of yet another embodiment of a seal assembly according to the present invention.

Referring now to FIG. 6, another embodiment of a seal assembly 110 according to the present invention is shown that has only one seal lip 112 with a pair of opposed engagement portions 114, 116. The seal lip 112 has a bearing portion in contact with an outer ring 118 of a multiple part bearing having a channel 120 that interlocks with an inner ring 122 of the bearing, and an exclusion lip 124 connected to each end of the bearing portion. Each engagement portion 114, 116 has an arcuate shape and contacts a wall structure 126, forming a space between the engagement portions 114, 116 and wall structure 126. The wall structure 126 is formed as part of a first housing portion 128 which has a circular shape and an inner space 130 where a portion of the seal lip 112 with engagement portion 116 is enclosed. A second housing portion 132 interlocks with the first housing portion 128 at a locking point 134 by, for example, frictional forces caused by press fitting the first housing portion 128 into the second housing portion 132 to form a housing that encloses the seal lip 112, bearing 118, 122 and wall structure 126. The second housing portion 132, as shown, has a circular shape with an open face, which is closed by wall 136 of the first housing portion 128. One or both of the housing portions 128, 132 can have one or more openings formed therethrough. The outer ring 118 of the bearing is in contact with the seal lip 112 while the inner ring 122 of the bearing is in contact with a rotating element, such as a shaft. The channel 120 of outer ring 118 is formed along an interior surface of the outer ring 118 and has a shape that mates with a protrusion 138 formed on the outer surface of the inner ring 122. The protrusion 138 fits within the channel 120 and creates a friction fit between the outer ring 118 and inner ring 122, allowing force applied to the outer ring 118 by the seal lip 112 to be transmitted to the inner ring 122 and slide the entire bearing along the rotating element when the seal lip 112 slides. In this configuration, the first housing portion 128 contacts a first side surface 140 of the seal lip 112 and the second housing portion 132 contacts a second side surface 142 of the seal lip 112 to allow for force applied to either housing portions 128, 132 to be transmitted throughout the seal assembly 110 and cause axial movement of the seal assembly 110, in a similar manner to previously described seal assemblies 20 and 80. The outer ring 118 of the bearing can be made of a metal, such as stainless steel, to provide stiffness to the inner ring 122 of the bearing, which can be made of a low friction polymer, in applications where stiffness is desired but there is the possibility of slip between the bearing 118, 122 and the shaft, which could result in metal shavings being introduced into the seal if the bearing is constructed completely out of metal.

Figure 7:
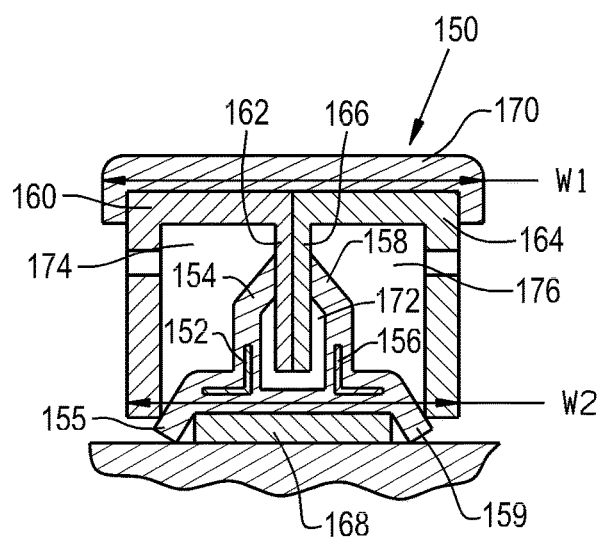
FIG. 7 is a cross-sectional view of yet another embodiment of a seal assembly according to the present invention.

Referring now to FIG. 7, another embodiment of a seal assembly 150 according to the present invention is shown that has a first seal lip 152 with a first engagement portion 154 and exclusion lip 155, a second seal lip 156 with a second engagement portion 158 opposed to the first engagement portion 154 and exclusion lip 159, a housing that is divided into a first housing portion 160 having a first wall structure 162 and a second housing portion 164 having a second wall structure 166, a bearing 168 in contact with bearing surfaces of the first seal lip 152 and second seal lip 156, and a joining member 170 interlocking the first housing portion 160 and second housing portion 164 together to form a housing that encloses the seal lips 152, 156 and bearing 168. The first engagement portion 154 contacts the first wall structure 162 and the second engagement portion 158 contacts the second wall structure 166 in such a way that a space 172 is formed between the first seal lip 152, the first wall structure 162, the second seal lip 156, and the second wall structure 166. The first housing portion 160 encloses the first seal lip 152 forming a first open space 174 between the first housing portion 160 and first seal lip 152 and the second housing portion 164 encloses the second seal lip 156 forming a second open space 176 between the second housing portion 164 and second seal lip 156. The first housing portion 160 and second housing portion 164 can both have an opening formed within their structure that allows for the escape of contaminants or lubrication to be introduced into the first open space 174 and second open space 176, respectively. The first housing portion 160 and second housing portion 164 can both have a circular shape similar to previously described first housing portion 128. The joining member 170 can also have a circular shape with a width W1 that is slightly greater than a combined width W2 of the housing formed by the first housing portion 160 and second housing portion 164, with the joining member 170 being, for example, press fit onto the housing to keep the first housing portion 160 and second housing portion 164 together. The joining member 170 can also transmit an applied force to the first and second housing portions 160, 164, which allows for movement of the entire seal assembly 150 in the direction of the applied force similarly to previously described seal assemblies.

Figure 8:
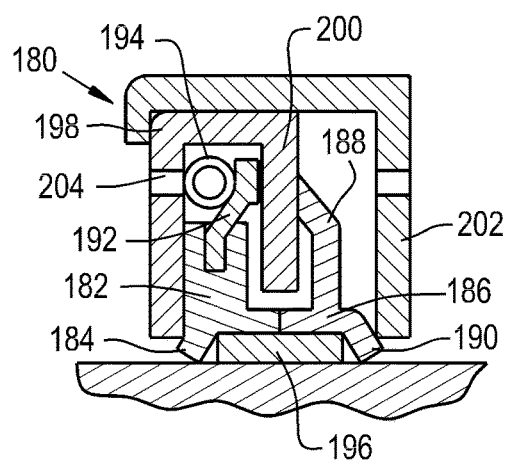
FIG. 8 is a cross-sectional view of yet another embodiment of a seal assembly according to the present invention.

Referring now to FIG. 8, another embodiment of a seal assembly 180 according to the present invention is shown that includes a first seal lip 182 having an exclusion lip 184, a second seal lip 186 having an engagement portion 188 and an exclusion lip 190, a press member 192 inserted adjacent to the first seal lip 182 and opposed to the engagement portion 188 of the second seal lip 186, an energizing element 194 contacting the press member 192, a bearing 196 that contacts bearing surfaces of the first seal lip 182 and second seal lip 186, a first housing portion 198 that encloses the first seal lip 182 and includes a wall structure 200 contacting and between the engagement portion 188 and press member 192, and a second housing portion 202 that contacts the second seal lip 186 and interlocks with the first housing portion 198 to form a housing which encloses the first seal lip 182, second seal lip 186, and bearing 196. The first seal lip 182 can be, for example, constructed of a rubber material and surround the press member 192. The energizing element 194, shown as a garter spring, is inserted adjacent to and in contact with the press member 192, with force exerted by the spring 194 keeping the press member 192 in contact with the wall structure 200, which can also be referred to as a sealing surface. While the spring 194 is shown being placed near an opening 204 in the first housing portion 198, the spring 194 can be placed anywhere within the first housing portion 198 that allows force exerted by the spring 194 to keep the press member 192 in contact with the sealing surface 200. The second seal lip 186 with engagement portion 188 is configured similarly to the second seal lip 156 shown in FIG. 7 and described previously. The second housing portion 202 can be press fit into a bore of a working machine to interlock with the first housing portion 198 and form the housing that will enclose the first seal lip 182, second seal lip 186, and bearing 196. When a force is applied to the housing 198, 202 or a shaft in contact with the bearing 196, the force gets transmitted throughout the seal assembly 180 similarly to previously described seal assemblies, with the press member 192 being analogous to previously described engagement portions for the seal lip that the press member 192 is adjacent to.

Figure 9:
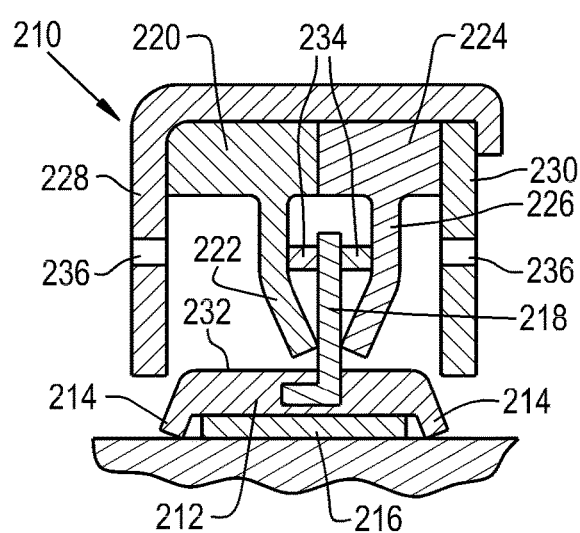
FIG. 9 is a cross-sectional view of yet another embodiment of a seal assembly according to the present invention.

Referring now to FIG. 9, another embodiment of a seal assembly 210 according to the present invention is shown that includes a seal lip 212 having an exclusion lip 214 connected to opposing ends of a bearing portion of the seal lip 212, a bearing 216 in contact with a bearing surface on the bearing portion of the seal lip 212, a wall structure 218 interlocked with the seal lip 212 that extends in a radial direction, a first engagement structure 220 having a first force transfer portion 222 pressed against the wall structure 218, a second engagement structure 224 having a second force transfer portion 226 opposed to the first force transfer portion 222 and pressed against the wall structure 218, and a housing divided into a first housing portion 228 and second housing portion 230 that encloses the seal lip 212 and bearing 216. A slot or opening can be formed in the seal lip 212 that the wall structure 218 will be interlocked within by, for example, press fitting the wall structure 218 within the slot, or, alternatively, the wall structure 218 can be formed as an integral part of the seal lip 212. The wall structure 218 extends radially outward, relative to an outer surface 232 of the seal lip 212, in between the first force transfer portion 222 and the second force transfer portion 226. A space is formed between the first and second force transfer portions 222, 226 and the wall structure 218, which can allow for flexion of the force transfer portions 222, 226. To limit the amount of flexion that the force transfer portions 222, 226 experience during operation, a limiting lug 234 can be formed on each force transfer portion 222, 226 so that the limiting lugs 234 are in contact with the wall structure 218. The limiting lugs 234 can provide protection to their respective force transfer portion in the event that a large pressure is applied to the seal assembly 210 that might otherwise crush a force transfer portion of the engagement structures and to correctly position the force transfer portions 222, 226 during assembly. The first and second engagement structures 220, 224 can be press fit within the housing 228, 230 or otherwise connected to the housing 228, 230. As shown, the first engagement structure 220 is axially contacted by first housing portion 228 and the second engagement structure 224 is axially contacted by second housing portion 230. One or more of the housing portions 228, 230 can have an opening 236 formed therethrough. When an axial force is applied to the housing 228, 230, one of the housing portions 228, 230 pushes on its respectively contacting engagement structure 220, 224, which pushes on the wall structure 218 with its respective force transfer portion. The resulting pushing forces move the entire seal assembly 210 in the direction of the applied force, similarly to previously described seal assemblies.

Figure 10:
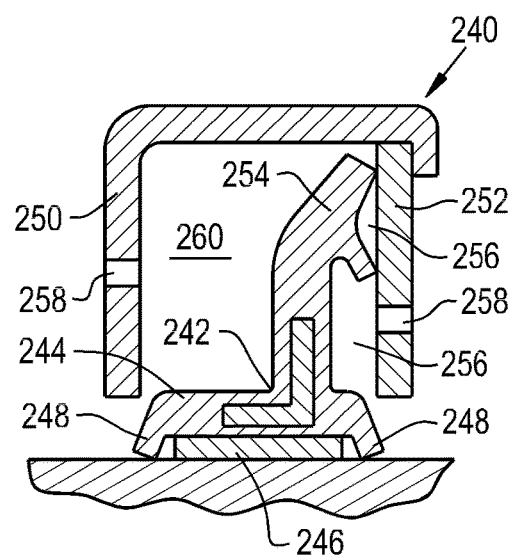
FIG. 10 is a cross-sectional view of yet another embodiment of a seal assembly according to the present invention.

Referring now to FIG. 10, another embodiment of a seal assembly 240 according to the present invention is shown that includes a seal lip 242 with a bearing portion 244, a bearing 246 in contact with a bearing surface of the bearing portion 244, a pair of exclusion lips 248 connected to opposing ends of the bearing portion 244, and a housing divided into a first housing portion 250 and a second housing portion 252 that are interlocked to enclose the seal lip 242 and bearing 244. The seal lip 242 has an engagement portion 254 connected to the bearing portion 244 that extends away from the bearing portion 244 to contact the second housing portion 252, forming one or more spaces 256 between the engagement portion 254 and the second housing portion 252. The space(s) 256 can be connected to an area outside the housing 250, 252 through an opening 258 formed in the second housing portion 252, sealed off from the area outside the second housing portion 252, or both. A space 260 is also formed between the first housing portion 250 and the seal lip 242 that can connect to an area outside the housing 250, 252 by another opening 258 formed in the first housing portion 250. The first housing portion 250 and second housing portion 252 can both contact the seal lip 242 near the exclusion lips 248, but one or both portions 250, 252 can come out of contact with the seal lip 242 during operation of the seal assembly 240. When an axial force is applied to one of the housing portions 250, 252, one or both of the housings 250, 252 pushes on the seal lip 242 or engagement portion 254 in the direction of the applied force. The exclusion lips 248 of the seal lip 242 can transmit the applied force to the bearing 246 if there is not enough friction between the bearing portion 244 and the bearing 246 to move the bearing 246 in the direction of the applied force. The net result of the applied force is axial movement of the seal assembly 240, similarly to previously described seal assemblies.

Figure 11:
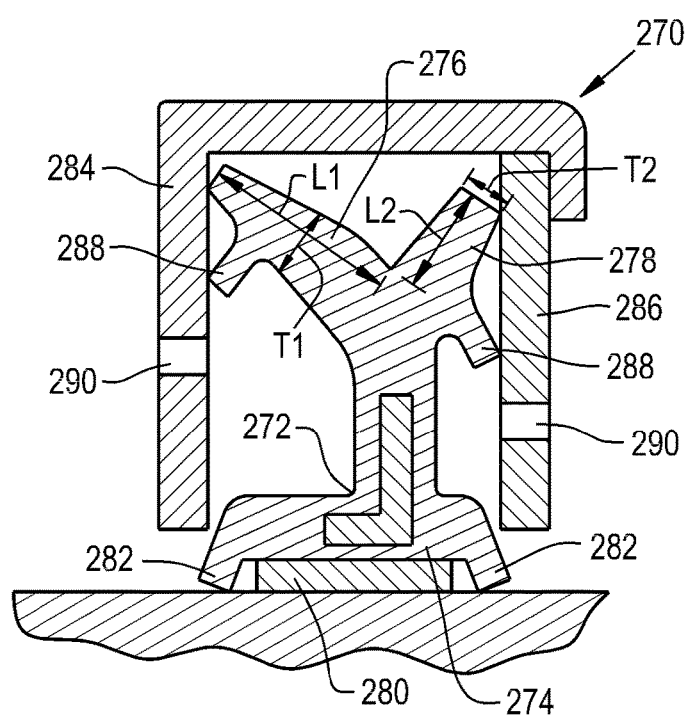
FIG. 11 is a cross-sectional view of yet another embodiment of a seal assembly according to the present invention.

Referring now to FIG. 11, another embodiment of a seal assembly 270 according to the present invention is shown that includes a seal lip 272 with a bearing portion 274 and a first engagement portion 276 and a second engagement portion 278 connected to the bearing portion 274, a bearing 280 contacting a bearing surface of the bearing portion 274, an exclusion lip 282 connected to each end of the bearing portion 274, and a housing divided into a first housing portion 284 interlocked with a second housing portion 286 that encloses the seal lip 272 and bearing 280. As can be seen, the first engagement portion 276 is pressed against the first housing portion 284 and the second engagement portion 278 is pressed against the second housing portion 286. The first engagement portion 276 has a first length L1 and a first thickness T1 that can be different than a second length L2 and a second thickness T2 of the second engagement portion 278. The first length L1 and first thickness T1 of the first engagement portion 276 and second length L2 and second thickness T2 of the second engagement portion 278 can be adjusted, as required, to bias both the sealing forces and sealing positions to achieve best sealing practice. Each engagement portion 276, 278 can also have a bracing portion 288 formed thereon that is also in contact with the respective housing portion that the engagement portion is in contact with. The bracing portion 288 can be formed on the engagement portions 276, 278 so that flexion of the engagement portions 276, 278 can be limited by the bracing portions 288 during axial movement and to provide another sealing lip for increased sealing ability. The first housing portion 284 and second housing portion 286 can each have an opening 290 formed therein that allows for lubrication to enter and/or contaminants to exit the seal assembly 270. The first housing portion 284 can be formed as a circular structure with an open face that is press fit onto the second housing portion 286 to form the housing. The seal lip 272 can be formed as a single, molded rubber piece or as multiple pieces from any material suitable for best sealing practices. An axial force applied to the housing 284, 286 will transmit to the respectively contacting engagement portion and bracing portion of the seal lip 272, transmitting the applied force to the seal lip 272, bearing 280, and other housing portion in a manner similar to previously described seal assemblies.

Figure 12:
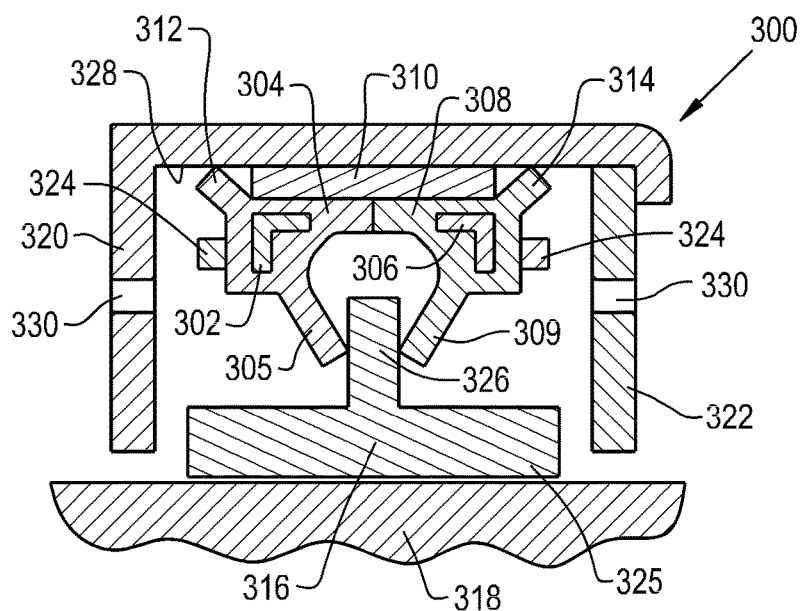
FIG. 12 is a cross-sectional view of yet another embodiment of a seal assembly according to the present invention.

Referring now to FIG. 12, another embodiment of a seal assembly 300 according to the present invention is shown that includes a first seal lip 302 having a first bearing portion 304 and a first engagement portion 305, a second seal lip 306 opposed to the first seal lip 302 having a second bearing portion 308 and a second engagement portion 309, a bearing 310 in contact with bearing surfaces of the first bearing portion 304 and second bearing portion 308, a first exclusion lip 312 connected to an end of the first bearing portion 304, a second exclusion lip 314 connected to an end of the second bearing portion 308, a wall structure 316 press fit onto a shaft 318 and contacting the engagement portions 305, 309 of the seal lips 302, 306, and a housing divided into a first housing portion 320 and a second housing portion 322 that encloses the seal lips 302, 304 and bearing 310. Unlike previously shown and described seal assemblies, seal assembly 300 has a bearing 310 that has an inner surface in contact with the bearing surfaces of the bearing portions 304, 308 and an outer surface in contact with the first housing portion 320. Lugs 324 can be formed or placed on the first seal lip 302 and second seal lip 306 to limit the axial travel of the seal lips 302, 306 and bearing 310, relative to the housing portions 320, 322, that occurs during operation. The wall structure 316 can include an annular ring 325 disposed around the shaft 318, with a wall portion 326 extending radially outward from the wall structure 316 to provide a contact surface for the first engagement portion 305 and second engagement portion 309. The housing 320, 322 can be press fit onto the other components of the seal assembly 300 so that they are enclosed within the housing 320, 322, with the seal lips 302, 306 and the bearing 310 being pressed against an inner surface 328 of the first housing portion 320. The first housing portion 320 and second housing portion 322 can each include an opening 330 formed therein to allow for escape of contaminants from the seal assembly 300 as well as lubricant to be added within the seal assembly 300. The wall structure 316 can be press fit onto the shaft 318 before putting the seal lips 302, 306 and bearing 310 into place around the wall structure 316. The housing 320, 322 can then be press fit onto the other components to complete the seal assembly 300. By having the bearing 310 on the inner surface 328 of the first housing portion 320, the sliding counterface within the seal assembly 300 can be tightly controlled and in the seal assembly 300 which leads to reduced cost and wear as well as improved control over when slip occurs.

While the seal assemblies previously described are typically used to seal environments in the axial direction along a rotating element, a seal assembly according to the present invention could also be configured to seal in a radial direction.

Figure 13:
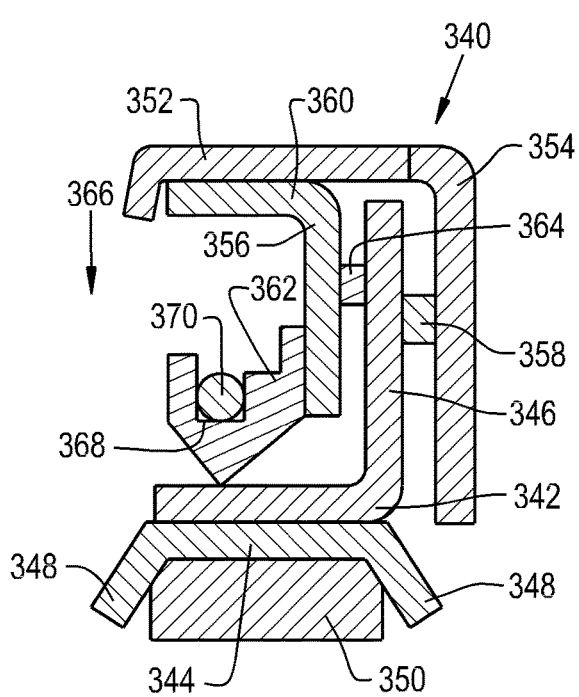
FIG. 13 a cross-sectional view of yet another embodiment of a seal assembly according to the present invention.

Referring now to FIG. 13, an embodiment of a seal assembly 340 according to the present invention is shown that can be used when sealing in the radial direction is desired. The seal assembly 340 includes a seal lip 342 with a bearing portion 344, an engagement portion 346 and an exclusion lip 348 connected to each end of the bearing portion 344, a bearing 350 in contact with a bearing surface of the bearing portion 344, a housing divided into a first housing portion 352 interlocked with a second housing portion 354 that encloses the seal lip 342 and bearing 350, and a biasing element 356 placed within the housing 352, 354 and in contact with the seal lip 342. The seal lip 342 is configured similarly to previously described seal lips, and can have a lug 358 attached to the engagement portion 346 facing the second housing portion 354 to limit axial movement of the seal lip 342 within the housing 352, 354. The biasing element 356 can include a housing engagement portion 360 that is in contact with the first housing portion 352 and a flex section 362 that is biased toward the bearing portion 344 of the seal lip 342. A lug 364 can also be formed on the housing engagement portion 360 to limit axial movement of the biasing element 356 within the housing 352, 354. The flex section 362 is formed from a flexible material, such as rubber, that can deform in response to changing pressures within the sealing environment to apply forces of differing magnitude on the seal lip 342 to bias the seal lip 342 into the bearing 350, which can be placed on a rotating element such as a shaft. The deformation of the flex section 362 can therefore adjust the forces applied to the seal lip 342 in a radial direction, denoted by arrow 366, to seal in the radial direction 366. As shown, flex section 362 can include a recess 368 formed within where an energizing element 370, shown as a garter spring, is held to help bias the flex section 362 into the seal lip 342 so that consistent sealing can occur. However, it should be appreciated that the profile of the biasing element 356 can be chosen such that the load applied to the seal lip 342 is sufficient to provide constant sealing in the radial direction 366 without the need for the energizing element 370. The seal assembly 340 can also travel in the axial direction similar to previously described seal assemblies.

Figure 14:
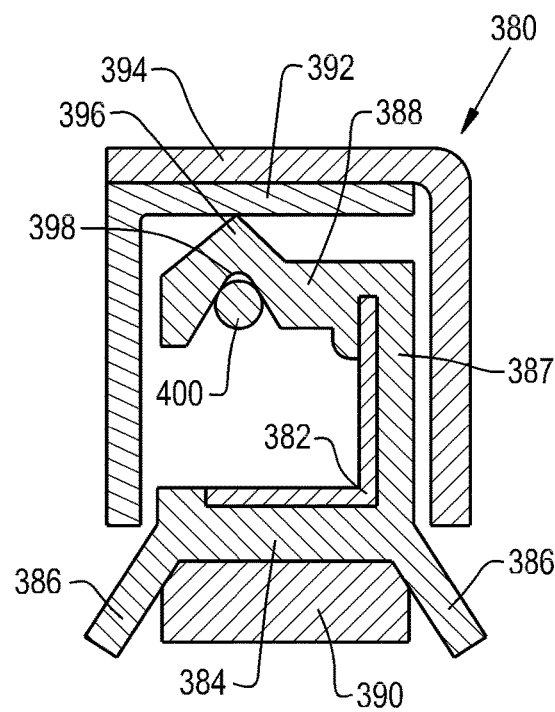
FIG. 14 a cross-sectional view of yet another embodiment of a seal assembly according to the present invention.

Referring now to FIG. 14, another embodiment of a seal assembly 380 according to the present invention is shown that can be used when sealing in the radial direction is desired. The seal assembly 380 includes a seal lip 382 that has a bearing portion 384, an exclusion lip 386 connected to each end of the bearing portion 384, an engagement portion 387 and a flex section 388 connected to the engagement portion 387, a bearing 390 in contact with a bearing surface of the bearing portion 384, and a housing divided into a first housing portion 392 interlocked with a second housing portion 394 that encloses the seal lip 382 and bearing 390. As can be seen, the bearing portion 384 and engagement portion 387 of the seal lip 382 are similar to those of the seal lip 342 shown in FIG. 13. The flex section 388, as shown, is an integral part of the seal lip 382, but could also be press fit onto the seal lip 382, and is formed from a flexible material. The flex section 388 has a housing engagement portion 396 that presses into the first housing portion 392 and can deform in response to pressure changes in the sealing environment to adjust the force that is applied to the housing portions 392, 394 in the radial direction. The flex section 388 can include a recess 398 that an energizing element 400, shown as a garter spring, can be held within to help bias the housing engagement portion 396 into the first housing portion 392, but it should be appreciated that the energizing element 400 is an optional feature. It can therefore be seen that seal assembly 380 is configured similarly to seal assembly 340 shown in FIG. 13, with the flex section 388 of seal assembly 380 pressing into the housing portions 392, 394 rather than the bearing portion 384 of seal lip 382.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A seal assembly, comprising:
   a first seal lip comprising an exclusion lip configured to contact an axially extending rotating element, a bearing portion, and a radially extending engagement portion;
   a second seal lip opposed to said first seal lip and comprising a second exclusion lip configured to contact the rotating element, a second bearing portion, and a second radially extending engagement portion;
   a bearing in contact with the bearing portion of said first seal lip and the second bearing portion of said second seal lip, the bearing coupling the first seal lip and the second seal lip together and configured to contact the rotating element;
   a wall structure having an axial wall section and a radial wall section placed between and in contact with the engagement portion of said first seal lip and the second engagement portion of said second seal lip; and
   a housing enclosing said first seal lip, said second seal lip and said bearing, the housing comprising a first housing part and a second housing part, the first housing part comprising a first radial housing section on one axial side of the wall structure, a first axial housing section coupled to the first radial housing section and contacting the axial wall section, and a retaining section, the second housing part comprising a second radial housing section on an opposite axial side of the wall structure, relative to the first radial housing section, and a second axial housing section in contact with the first axial housing section, the second housing part and the wall structure being nested between the retaining section and the first radial housing section of the first housing part, said housing configured to axially slide said first seal lip, said second seal lip, said wall structure and said bearing as said housing axially slides, said first radial housing section including a first tracking surface, said second radial housing section including a second tracking surface, when the first tracking surface is configured to contact said first seal lip when said housing axially slides in a first direction then the second tracking surface is configured not to contact the second seal lip and when the second tracking surface is configured to contact said second seal lip when said housing axially slides in a second direction that is opposite to said first direction then the first tracking surface is configured not to contact the first seal lip, said first seal lip and said second seal lip being disposed on opposite axial sides of said wall structure.

2. The seal assembly according to claim 1, wherein said seal assembly is disposed around a rotating element and said bearing has an inner surface in contact with said rotating element.

3. The seal assembly according to claim 1, wherein at least one of said first seal lip and said second seal lip includes a lug facing said wall structure.

4. The seal assembly according to claim 1, wherein said bearing is a multiple part bearing.

5. The seal assembly according to claim 4, wherein said multiple part bearing includes a male bearing ring, a female bearing ring and a shaft engaging ring.

6. The seal assembly according to claim 4, wherein said multiple part bearing includes an inner bearing ring and an outer bearing ring interlocked with said inner bearing ring.

7. The seal assembly according to claim 1, wherein said housing has at least one opening formed through.

8. The seal assembly according to claim 1, wherein at least one of said first seal lip and said second seal lip includes a lug formed thereon configured to limit axial movement of said lip within said housing.

* * * * *